Feb. 2, 1954  O. C. MONTGOMERY  2,668,282
TRANSMITTER FOR RADIO SEISMIC SYSTEMS
Filed Sept. 20, 1948  2 Sheets-Sheet 1

*INVENTOR.*
ORIN C. MONTGOMERY
BY
*ATTORNEYS*

Patented Feb. 2, 1954

2,668,282

UNITED STATES PATENT OFFICE 2,668,282

TRANSMITTER FOR RADIO SEISMIC SYSTEMS

Orin C. Montgomery, Bartlesville, Okla., assignor to Phillips Petroleum Company, a corporation of Delaware Application September 20, 1948, Serial No. 50,202

3 Claims. (Cl. 340—15)

This invention relates to a radio transmitter particularly adapted for providing an indication of shot time in a radio seismic system. In another aspect, it relates to a receiver for recording the shot time at a location remote from the transmitter. In still another aspect, it relates to a method of transmitting seismic time breaks. In still another aspect, it relates to a method of and apparatus for simultaneously transmitting time break signals and other intelligence over a single radio channel.

In seismic systems, an explosive charge is detonated in the earth at a location identified as the shot point. The explosion produces seismic waves which are reflected from subterranean strata and received at several locations by seismometers or geophones, which convert the received seismic waves into electrical voltages representative thereof. These voltages are ordinarily recorded by a common unit, the time elapsing between the detonation and the arrival of the seismic waves at the respective geophones yielding valuable information regarding the subterranean strata.

From the foregoing, it will be apparent that the detonation time, commonly referred to as the time break or shot time, must be recorded with a high degree of accuracy to permit useful measurements to be made of the period between the time break and the time at which the seismic waves are received by the seismometers. It has been proposed to transmit a radio signal at the instant the time break occurs, and utilize such signal to actuate a receiver at the recording location, the output of the receiver being fed to one of the galvanometer units of the recorder to provide a time break indication.

However, considerable difficulty has been experienced in providing a radio linkage for transmitting signals which indicate shot time in a seismic system to a receiver which is remote therefrom. In such a system, it is desirable that the same channel over which the time break signals are transmitted may be also used for carrying speech or other intelligence. In the methods and apparatus of the prior art, this has necessitated elaborate switching arrangements which have not proved reliable on a practical and commercial scale.

It is an object of this invention to provide a novel radio transmitter and receiver for transmitting time break signals with or without the simultaneous transmission of speech or other intelligence.

It is a further object of the invention to provide a receiver for separating the speech and time break components in the transmitted radio waves.

It is a still further object of the invention to provide an improved method of and apparatus for transmitting and recording the time break information.

It is a still further object of the invention to provide apparatus which is reliable in operation, rugged in construction, low in cost, and which may be readily manufactured from standard components.

Various other objects, advantages and features of the invention will become apparent from the following detailed description taken in conjunction with the accompanying drawings, in which.

Figure 1:
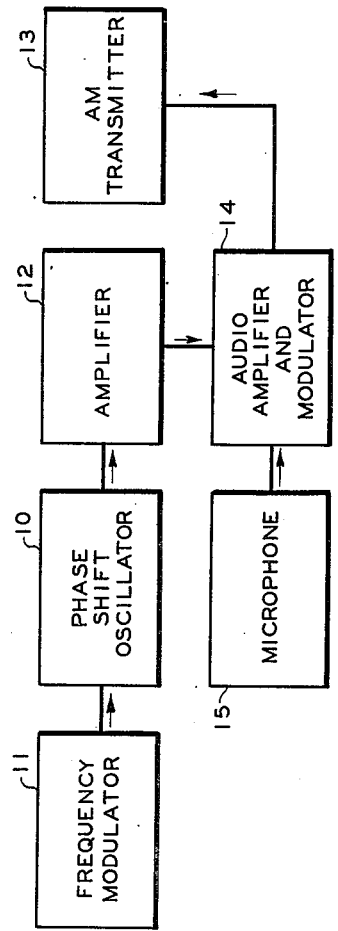
Figure 1 is a block diagram of the transmitter.

Referring now to the drawings in detail, and particularly to Figure 1, the transmitter comprises an audio frequency oscillator 10 whose frequency of oscillation is controlled by a phase shift network so as to normally produce audio frequency oscillations of a predetermined frequency. A frequency modulator 11 works into the oscillator and, in general, it is connected in the phase shift network in such fashion that detonation of an electric blasting cap included in the frequency modulator circuit produces an abrupt shift in frequency of the oscillator 10. The audio frequency signal from oscillator 10 is fed to an amplifier 12 and the output of this amplifier is used to amplitude modulate a radio frequency carrier wave produced by a transmitter 13. Thus, in effect, the oscillator 10 produces a subcarrier which amplitude modulates transmitter 13 and which is, in turn, frequency modulated by the unit 11. In accordance with the invention, transmitter 13 is also amplitude modulated by the output of an audio or speech amplifier 14 which is fed by a microphone 15. The speech signals from microphone 15 and amplifier 14 do not cause any appreciable interference with the signals from frequency modulated audio oscillator 10 since the latter signals consist principally of low frequency amplitude changes, with a very small or negligible frequency variation at the frequency of oscillator 10.

Figure 2:
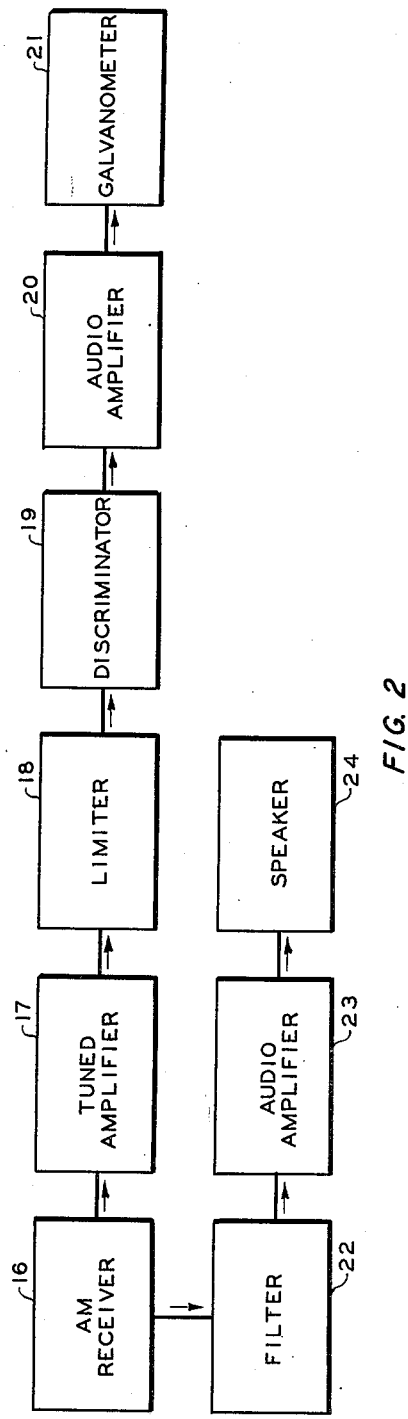
Figure 2 is a block diagram of the receiver.

The signals from the transmitter of Figure 1 are received by the apparatus of Figure 2 which includes a conventional amplitude modulation receiver 16 for demodulating the carrier wave, thereby providing an audio frequency voltage representative of the modulating signals fed to the transmitter 13. The receiver has two channels, one for demodulating and recording the frequency modulated signal produced by detonation of the blasting cap, and the other for reproducing the speech or other intelligence fed into the microphone 15 of Figure 1. The first channel comprises an amplifier 17 which is tuned to the narrow band of frequencies produced by the oscillator 10 and modulator 11 of Figure 1, this band of frequencies being in the neighborhood of 3,000 cycles per second. The output of amplifier 17 is fed to a limiter 18 which operates, in a known manner, to eliminate the portions of the signal which are of greater than a predetermined magnitude. Thus, the output of the limiter consists of a series of square waves of constant amplitude but varying frequency which are fed to discriminator 19.

The unit 19 is also of conventional construction and its function is to demodulate or detect the frequency variations in the incoming signal. Discriminator 19 utilizes a balanced circuit so that, during operation of oscillator 10 at its normal predetermined frequency, no output voltage is produced. This occurs when the oscillator is operating at said normal frequency before the detonation of the blasting cap. When the blasting cap is broken by detonation of an explosive charge, that is, when a time break occurs, frequency modulator 11 causes the frequency of the oscillator signal to deviate from its normal frequency. Thereupon, discriminator 19 produces an output voltage of generally sinusoidal waveform whose amplitude is proportional to the frequency deviation and this voltage is fed to an audio amplifier 20 which drives a galvanometer 21 forming a part of a suitable recorder unit. In this manner, the shot time or time break is accurately indicated by the voltage pulse impressed upon the galvanometer. Since a frequency modulation circuit is used, transient voltages have very little effect upon the system and, hence, do not affect the reading of the galvanometer. It has been found that the system functions with very high fidelity to provide an indication of the exact instant at which the time break occurs.

The second channel of the receiver includes a filter 22 driving an audio amplifier 23, the output of which is fed to a speaker 24. The use of filter 22 is preferred but it is not essential to the operation of the invention, its function being to eliminate signals within the band utilized by the frequency modulated oscillator 10. Such filters are well known in the art and, hence, are not described in detail herein.

It will be apparent that the transmitter and receiver of this invention may be utilized for the simultaneous transmission of time break information and of speech or other intelligence. Thus, the frequency modulated signals are excluded from audio amplifier 23 and speaker 24 by the filter 22 while the speech voltages are substantially completely excluded from the frequency modulation portion of the receiver by tuned amplifier 17. The strength of the frequency modulated signal should be sufficient that the portion of the speech frequency band passed by tuned amplifier 17 is not of sufficient strength as to operate the discriminator and produce an indication on galvanometer 21. The band width utilized for the frequency modulation signal is so narrow that this can be accomplished without difficulty and elimination of this frequency band by the filter 22 does not appreciably lessen the intelligibility of the speech transmitted through audio amplifier 23 and speaker 24. Accordingly, the present system permits a simultaneous transmission of speech and time break impulses without the necessity for manipulating switches or making other adjustments. The use of the frequency modulation system for transmitting the time break impulse prevents interference with the signal by outside noises, such as static, by microphone noises, or by noise voltages generated in the transmitter circuit. Also, the frequency modulation circuits permit transformers and resistor-condenser circuits tending to introduce a time delay to be substantially eliminated.

Figure 3:
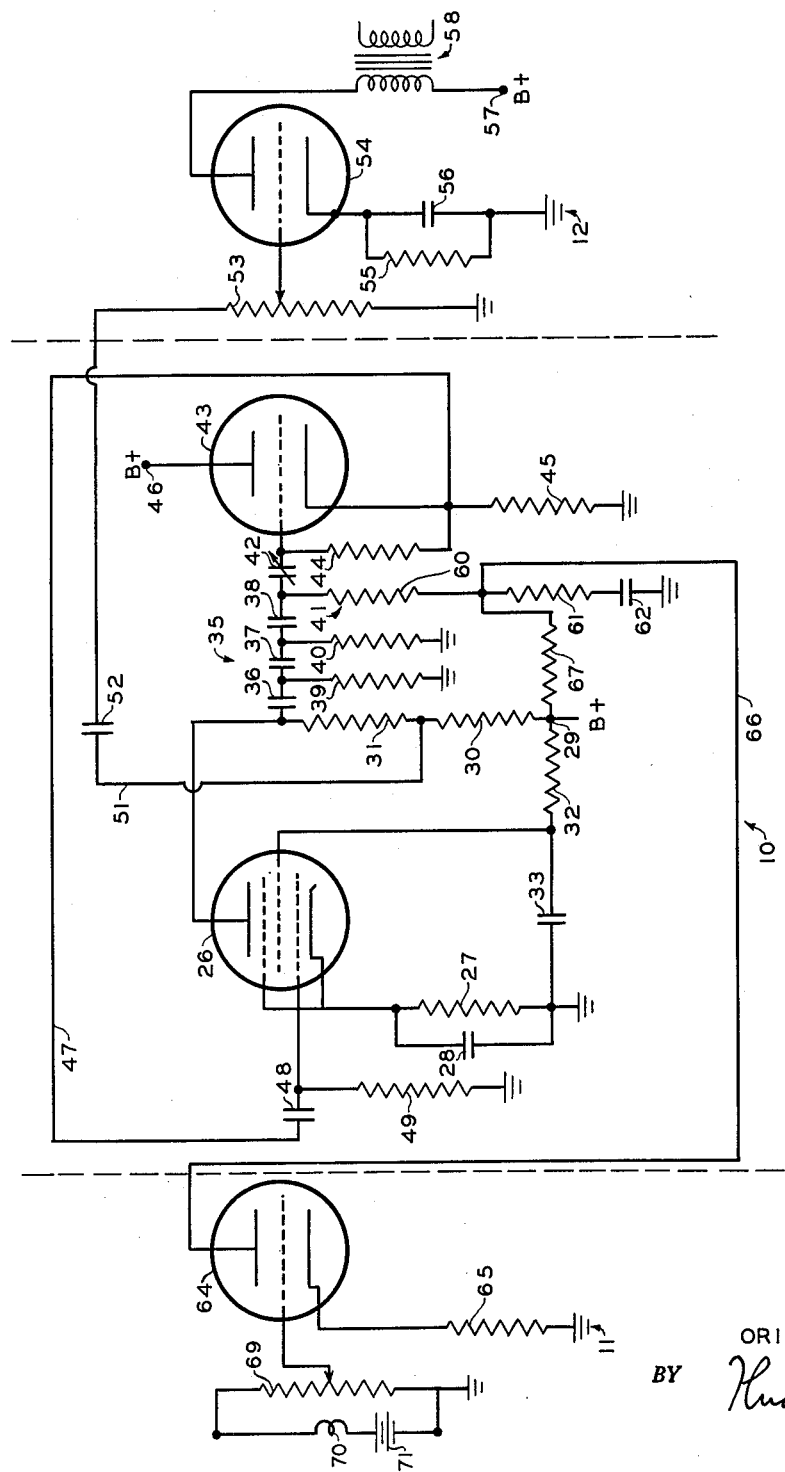
Figure 3 is a schematic diagram of certain portions of the circuit illustrated by Figure 1.

The phase shift oscillator 10, frequency modulator 11 and amplifier 12 are shown in detail by the schematic circuit diagram of Figure 3. The oscillator circuit includes a tube 26 having an anode, a cathode, and a control grid. In the present example, the tube 26 is a pentode and has, in addition, a screen grid and suppressor grid but these extra elements are not essential to the functioning of the invention. The suppressor grid of the tube is connected to the cathode which is grounded through a resistor 27 shunted by a condenser 28. An operating potential is supplied to the anode from a positive power supply terminal 29 through resistors 30 and 31, the screen grid being connected to terminal 29 through a resistor 32 and to ground through a filter condenser 33.

A phase shift network, generally indicated by reference character 35, is connected in the anode circuit of oscillator tube 26, this network including three series connected condensers 36, 37 and 38 with grounded resistors 39 and 40 connected to the junctions between said condensers. The network also includes a resistance unit 41 connected between its output lead and ground, the output of the network being fed through a variable coupling condenser 42 to the control grid of a cathode follower tube 43. The grid of tube 43 has a grid resistor 44 connected to the cathode thereof and the cathode is grounded through a load resistance 45. The condenser 42 and resistor 44 also form a part of the phase shift network, and condenser 42 is variable to adjust the frequency of the phase shift oscillator, as will be apparent from the following description. The anode of tube 43 is connected to a positive terminal 46 of the power supply. The output of the tube 43 appears between the cathode and ground and this output is fed back to the grid of oscillator tube 26 by a lead 47 and coupling condenser 48, the signal being impressed upon a grid resistor 49 connected between the grid of tube 26 and ground.

The network 35 is designed to provide a 180 degree phase shift of the oscillator output voltage at a particular operating frequency determined by the values of condensers 36, 37, 38, and 42 and resistances 39, 40, 41, and 44. Thus, the network provides a 180 degree phase shift between the anode and the control grid of tube 26. As previously stated, this operating frequency is preferably within the audio range, for example, 3,000 cycles per second. The tube 43 functions as an impedance matching device between the control grid and anode circuits of tube 26, increases the stability of the circuit, and also provides a requisite amount of gain needed to maintain tube 26 in an oscillatory condition.

Out put voltage is taken from the anode circuit of oscillator tube 26 by a lead 51 connected to the junction between resistors 30 and 31, this lead extending through a coupling condenser 52 to one terminal of a potentiometer 53, the other terminal of which is grounded, and the movable arm of which is connected to the control grid of an amplifier tube 54. The cathode of tube 54 is grounded through a resistor 55 which is shunted by a condenser 56 and operating potential is supplied to the anode of the tube from a positive power supply terminal 57 through the primary winding of a transformer 58. A secondary winding of transformer 58 is connected, in a known manner, in the plate circuit of the output tube of transmitter 13 to effect amplitude modulation thereof. Tube 54 functions not only as an amplifier but also as an isolation circuit preventing interaction between oscillator 18 and audio amplifier 14.

When the blasting cap of the seismic system is broken by detonation of an explosive charge, the frequency of oscillator 19 is abruptly changed by varying the resistance of a portion of the phase shift network 35. Responsive to such a resistance change, the network 35 provides a 180 degree phase shift at a second frequency somewhat different from the original frequency of oscillation and, accordingly, the oscillator signal is shifted to such second frequency. To this end, the resistance unit 41 is connected between output lead of the network and ground, this unit including series connected resistors 60, 61 and a condenser 62. Resistor 61 and condenser 62 are shunted by the plate resistance of a modulator tube 64 having its cathode connected to ground through a resistor 65 and having its anode connected through a lead 66 to the junction between resistors 60 and 61. Operating potential is supplied to the anode from positive terminal 29 through a resistor 67 which is also connected to the junction between resistors 60 and 61. The control grid of modulator tube 64 is connected to the arm of a potentiometer 69 which is shunted by an electric blasting cap 70 connected in series with a battery 71.

Although the excitation circuit of tube 64 is shown as blasting cap 70 and battery 71, by way of example, I preferably utilize a balanced Wheatstone bridge circuit, as described in the copending application of Deslonde R. deBoisblanc and John E. Bondurant, Serial No. 628,310, filed November 13, 1945, entitled "Seismograph Blaster Time Breaker Circuit," now Patent No. 2,470,486, to apply a sudden sharp pulse of voltage to the grid of tube 64 when a time break occurs.

It will be apparent, therefore, that the plate resistance of tube 64 forms a part of phase shift network 35 and, with blasting cap 70 connected in circuit, the potentiometer 69 is adjusted so that interruption of the grid circuit of tube 64 by detonation of blasting cap 70, produces a desired predetermined change in the plate resistance of tube 64. Condenser 42 is then adjusted so that tube 26 oscillates at its normal predetermined frequency. When the charge is detonated, the circuit of blasting cap 70 is abruptly opened and the grid voltage of tube 64 is changed. As a result, there is a variation in the current flowing through the tube and a variation in its plate resistance. This changes the constants of phase shift network 35 and produces an abrupt change in the frequency of oscillator 26, the amount of frequency deviation being controlled by the setting of resistor 69. At the receiver, this frequency deviation produces a signal in discriminator 19 and provides an audio voltage which is amplified and actuates recording galvanometer 21 thereby providing a record of the shot instant or time break.

The described circuit has been found to be very satisfactory because the frequency of oscillation may be very rapidly changed without causing even a momentary interruption of the circuit oscillations. The circuit is very stable and is highly selective so that only a very narrow frequency band need be used to transmit the frequency modulated signals. The cathode follower 43 serves the purpose of matching the output impedance of the network to the input impedance of the tube 26, provides gain between the network and grid of tube 26, and increases stability. In this connection, it will be understood that other types of networks may be used to provide the 180 degree phase shift and, in some instances, other types of frequency modulated oscillators may be used. The circuits disclosed are very simple to adjust and may be used for simultaneous transmission of time break signals and speech without the necessity of manipulating switches or other controls.

While the invention has been described in connection with a present, preferred embodiment thereof, it is to be understood that this description is illustrative only and is not intended to limit the invention, the scope of which is defined by the appended claims.

Having described my invention, I claim:

1. Apparatus for transmitting time break signals and other intelligence over a single radio channel which comprises, in combination, a radio transmitter including an audio frequency oscillator, an electric blasting cap, a modulator circuit including said blasting cap and operated to vary the frequency of said oscillator responsive to the detonation of said blasting cap, means for producing a radio frequency carrier wave, means for amplitude modulating the carrier wave with the output of said oscillator, means for further amplitude modulating the carrier wave with other intelligence, and a radio receiver including an amplitude modulation receiver for demodulating said carrier wave to produce an audio frequency output signal, first and second channels fed by the audio frequency output of said receiver, said first channel including a limiter and discriminator, an audio amplifier fed by said discriminator, and an indicator sensitive to the output of said audio amplifier, said second channel including an audio amplifier, and a device responsive to said intelligence fed by the second channel audio amplifier.

2. Apparatus for simultaneously transmitting speech and time break signals over a single radio channel which comprises, in combination, a transmitter including an audio frequency oscillator having a phase shift network determining the frequency of oscillation thereof, an electric blasting cap, a frequency modulator circuit including said blasting cap, said circuit being operated to vary a component of said network responsive to detonation of said blasting cap, thereby to produce an abrupt change in the frequency of said oscillator, means for producing a radio frequency carrier wave, means for amplitude modulating said carrier wave with the output of said oscillator, a microphone, an audio amplifier fed by said microphone, means for amplitude modulating said carrier wave with the output of said audio amplifier, and a radio receiver including an amplitude modulation receiver for demodulating said carrier wave to produce an audio frequency output signal, first and second channels fed by the audio frequency output of said receiver, said first channel including an amplifier tuned to the frequency of said oscillator, a limiter and discriminator fed by said tuned amplifier, an audio amplifier fed by said discriminator, and a galvanometer sensitive to the output of said audio amplifier, said second channel including an audio amplifier, and a speaker fed by the second channel audio amplifier.

3. Apparatus for simultaneously transmitting time break signals and speech signals over a single radio channel which comprises, in combination, a transmitter including an oscillator tube having an anode, a cathode, and a control grid, a phase shift network connected in the anode circuit of said tube comprising three series connected condensers, grounded resistors connected to the junctions between said condensers, and a third resistance unit connected between the output conductor of said network and ground, a cathode follower tube having an anode, a cathode, and a control grid, means for feeding the output of said network to the control grid of said cathode follower, means connecting the cathode of said follower tube to the control grid of said oscillator tube, a modulator tube having an anode, a cathode and a control grid, the anode-cathode circuit of said modulator tube forming a part of said third resistance unit whereby a change in internal resistance of the tube causes a corresponding shift in the phase of the signal fed through said network, thereby to change the frequency of said oscillator, an electric blasting cap, a detonating circuit including said blasting cap connected between the control grid of said modulator tube and ground whereby detonation of said blasting cap causes a change in the control grid voltage of said modulator tube thereby changing the internal resistance thereof, means for supplying operating potentials to the anode and cathode of each tube, an amplifier, means for feeding the output of said oscillator tube to said amplifier means for feeding a speech signal to said amplifier, and means for amplitude modulating a radio frequency carrier with the output of said amplifier, and a receiver including an amplitude modulation receiver for demodulating said carrier wave to produce an audio frequency output signal, first and second channels fed by the audio frequency output of said receiver, said first channel including an amplifier tuned to the frequency of said oscillator, a limiter and discriminator fed by said tuned amplifier, an audio amplifier fed by said discriminator, and an indicating device sensitive to the output of said audio amplifier, said second channel including a filter for eliminating signals of the frequency of said oscillator, an audio amplifier and a speech-transducing device fed by the second channel audio amplifier.

ORIN C. MONTGOMERY.

References Cited in the file of this patent

UNITED STATES PATENTS

| Number | Name | Date |
|---|---|---|
| 1,950,406 | Hoorn | Mar. 13, 1934 |
| 2,237,522 | Clark | Apr. 8, 1941 |
| 2,303,493 | Purington | Dec. 1, 1942 |
| 2,407,308 | Lorenzen et al. | Sept. 10, 1946 |
| 2,413,116 | Shook et al. | Dec. 24, 1946 |
| 2,435,903 | Ritzman | Feb. 10, 1948 |
| 2,457,137 | Earp | Dec. 28, 1948 |
| 2,609,438 | Winterhalter | Sept. 2, 1952 |

OTHER REFERENCES

Radio Engineering, 3rd ed., by Terman, p. 437.